(12) United States Patent
McEnteggart

(10) Patent No.: US 6,328,331 B1
(45) Date of Patent: Dec. 11, 2001

(54) COLLAPSIBLE WHEELBARROW

(76) Inventor: Kevin P. McEnteggart, 113 Dereham Road, Barking, Essex 1G11 9EY (GB)

( * ) Notice: Subject to any disclaimer, the term of this patent is extended or adjusted under 35 U.S.C. 154(b) by 0 days.

(21) Appl. No.: 09/355,582

(22) PCT Filed: Feb. 2, 1998

(86) PCT No.: PCT/GB98/00324
§ 371 Date: Sep. 30, 1999
§ 102(e) Date: Sep. 30, 1999

(87) PCT Pub. No.: WO98/33692
PCT Pub. Date: Aug. 6, 1998

(30) Foreign Application Priority Data

Feb. 3, 1997 (GB) .................................................. 9702133

(51) Int. Cl.⁷ ...................................................... B62B 1/00
(52) U.S. Cl. .......................................................... 280/653
(58) Field of Search ................... 280/641, 79.2, 280/653, 659, 652, 645, 655, 47.3, 47.31, 47.32

(56) References Cited

U.S. PATENT DOCUMENTS

| 2,629,608 | * | 2/1953 | Jones ........................................ 280/36 |
| 4,471,996 | * | 9/1984 | Primeau ..................................... 298/3 |
| 5,372,376 | * | 12/1994 | Pharaoh ................................. 280/653 |
| 6,017,053 | * | 1/2000 | Leger et al. ........................... 280/653 |

\* cited by examiner

Primary Examiner—Brian L. Johnson
Assistant Examiner—G B Klebe
(74) Attorney, Agent, or Firm—Ipsolom LLP

(57) ABSTRACT

A heavy duty collapsible wheelbarrow having a frame (including, for example, a wheel and a pair of handles), and a container (sometimes referred to in the prior art as a tray or bucket), the container being securable to the frame in a "ready for use" position, and being releasable from this "ready for use" position to enable the wheelbarrow to be collapsed, the means for securing the container to the frame including an "over-center" mechanism.

8 Claims, 4 Drawing Sheets

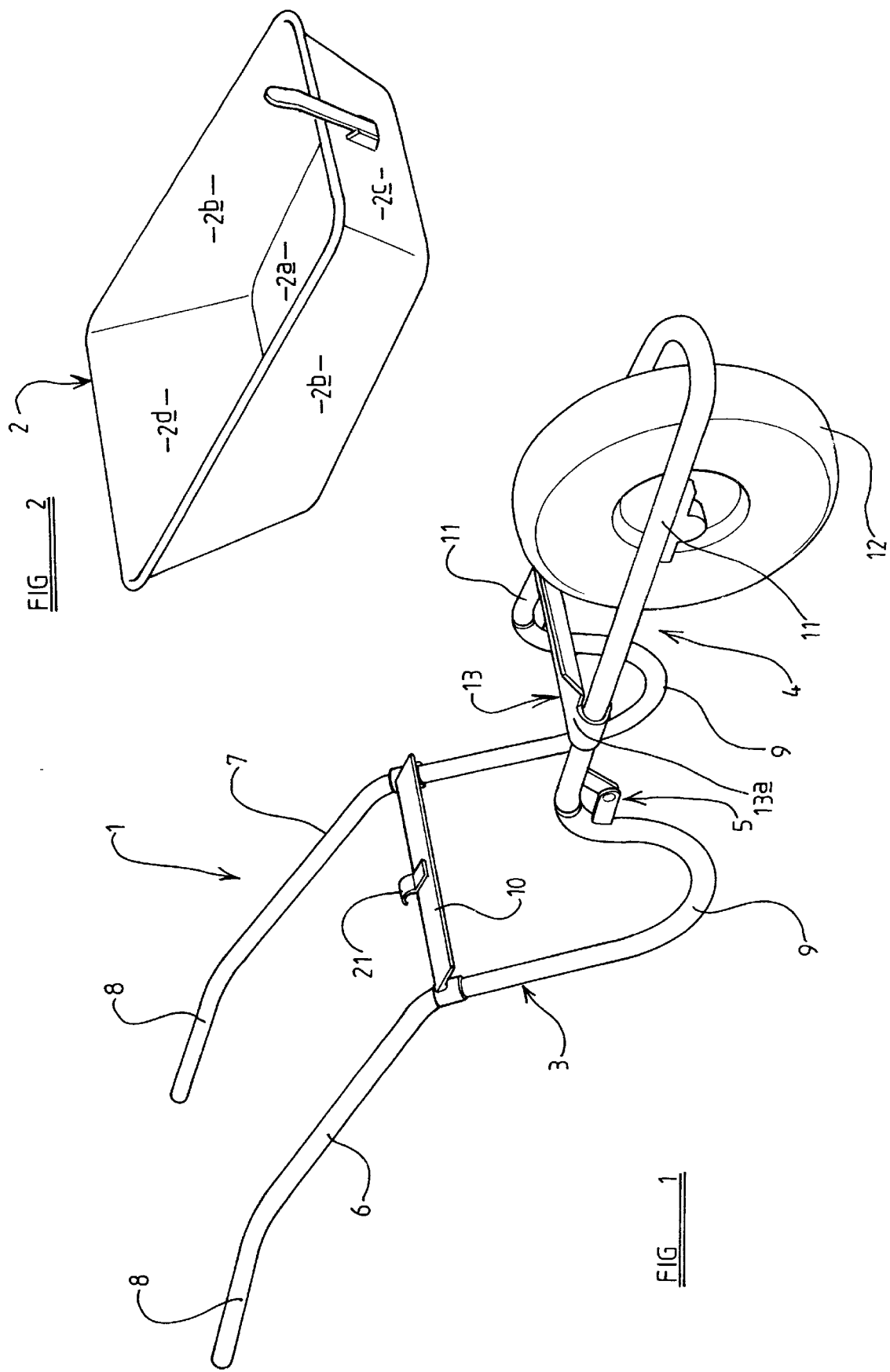

COLLAPSIBLE WHEELBARROW

This invention relates to wheelbarrows for heavy duty use, for example in the building trade. Such wheelbarrows may be used for carrying bricks or other building blocks, for carrying concrete or cement, or merely for carrying rubble.

Wheelbarrows need to be transported to and from building sites at the start and finish of a job. Also, where a job lasts for more than one day, if the site is not secure against theft, then it may also be necessary to remove wheelbarrows from the site when work has finished for the day and to transport them back to the site for the start of work the next day. Conventional wheelbarrows have quite long frames measured from handle end to wheel end, and they therefore take up a lot of space on a van or other transport.

It may happen that when wheelbarrows need to be transported there is insufficient space on whatever transport happens to be available at the time. Of course, a van or other transport can make an additional trip to pick up any remaining wheelbarrow(s) that could not be taken on the first trip. However, this is clearly unsatisfactory, not only because it is a waste of the drivers time and increases transport costs, but also because it may be necessary to pay a man to guard wheelbarrows awaiting the return of a driver to pick them up. For the reasons mentioned above, it may be cheaper to abandon one or more wheelbarrows at a building site than to return to collect them. It will be apparent from the above explanation that there is a great need for a heavy duty wheelbarrow which can be collapsed from a bulky "ready-for-use" position to a space saving position in which it can be stowed.

However, in spite of the obvious need for a heavy duty collapsible wheelbarrow, the inventor has not seen such a wheelbarrow offered for sale, The only currently available collapsible wheelbarrows known to the inventor are of lightweight construction, and have a collapsible container portion made of a deformable plastics material, or of canvas. These wheelbarrows are readily convertible between collapsed and "ready for use" positions, but they are designed for use in the garden, for example for carrying leaves, grass cuttings or other lightweight items. A wheelbarrow of the construction just described would very soon be destroyed if used on a building site.

In contrast to the above currently available collapsible wheelbarrows, the present invention is particularly concerned with a heavy duty collapsible wheelbarrow having a frame (including, for example, a wheel and a pair of handles), and a container (sometimes referred to in the art as a tray or bucket), the container being securable to the frame in a "ready for use" position, and being releasable from this "ready for use" position to enable the wheelbarrow to be collapsed. One problem with such wheelbarrows is that of securing the container firmly and rigidly to the frame in such a way that the wheelbarrow can rapidly be collapsed and erected, and it is believed that the reason that heavy duty collapsible wheelbarrows are not available for purchase is that nobody has yet found a satisfactory solution to this problem.

One could use a number of nuts and bolts. This would be effective in as much as it would provide a rigid and secure construction in use, but it has many disadvantages. For example, nuts and bolts are readily lost; one or more would be needed; care would be needed to ensure that the nuts were securely tightened, and the process would be time consuming. Also, the heads of the bolts, and/or the nuts, would be likely to become covered in mud or concrete making access to them difficult. The threads of the nuts or bolts would also be susceptible to mechanical damage and rust. It is clear from the above that the use of fasteners such as nuts and bolts would be entirely unsatisfactory in a wheelbarrow intended for use in the building trade.

Instead of nuts or bolts one could use pins adapted to be slid through holes in the container and through corresponding holes in the frame. This would enable the wheelbarrow to be erected and collapsed much quicker, but it would have important disadvantages. Firstly, the attachment of the container to the frame would not be as rigid as with nuts and bolts, and, during use of the wheelbarrow, relative movement would occur in the region where the pins pass through the holes in the frame and in the container. This movement would eventually lead to wear of the pins and of the parts through which they pass. Secondly, the pins would readily be lost. If the pins were to be hung on chains attached to the frame to prevent them from being misplaced, the chains would soon be broken during heavy work in the building trade. Further, it would become difficult to remove the pins and to re-insert them as the wheelbarrow becomes covered in mud, concrete, cement etc.

An aim of one aspect of the present invention therefore is to provide an improved way of securing the container to the frame which overcomes the disadvantages described above.

According to this aspect of the invention there is provided a heavy duty collapsible wheelbarrow comprising a frame, a container and means for securing the container to the frame in a "ready for use" position, the container being releasable from the "ready for use" position to enable the wheelbarrow to be collapsed, in which wheelbarrow the means for securing the container to the frame includes a fastening mechanism which is movable between a released position and a locking position and in which a tensile or compressive force acting on a member of the mechanism progressively increases as the fastening mechanism is moved from the released position towards the locking position.

In a preferred embodiment the fastening mechanism is an over-center mechanism and the tensile or compression force acting on the member progressively increases to a maximum as the mechanism is moved from the released position, after which the mechanism snaps to a stable locking position.

In another embodiment the tensile or compressive force acting on the member of the fastening mechanism progressively increases up to the locking position and the mechanism is held in the locking position by a catch.

The fastening mechanism of a preferred wheelbarrow according to the invention (described in detail below) allows fastening of the container to the frame to be achieved very quickly indeed, for example in between ten and thirty seconds depending on how experienced the user is. There are no nuts, bolts, or pins which could become lost or damaged, and no tools of any kind are required. None of the operative parts of the fastening mechanism lie inside the container to be covered in material such as concrete carried inside the wheelbarrow.

According to another aspect of this invention there is provided a heavy duty collapsible wheelbarrow having a frame, and a container, the container being securable to the frame in a "ready for use" position, and being releasable from this "ready for use" position to enable the wheelbarrow to be collapsed, the frame comprising two parts, one of which carries a wheel for supporting the wheelbarrow on the ground, and the other of which carries a pair of handles used for lifting and wheeling the wheelbarrow, the two frame parts being either hinged together, or being detachably connected together, and both parts of the frame serving in use to support the container.

According to yet another aspect of this invention there is provided a heavy duty collapsible wheelbarrow having a frame and a container, the container being securable to the frame in a "ready for use" position, and being releasable from this "ready for use" position to enable the wheelbarrow to be collapsed, the frame having two crossbars spaced apart in the longitudinal direction of the wheelbarrow so that there is a rear crossbar and a front crossbar, at least one longitudinal bar being secured to the underside of the container, the front crossbar co-operating with the container during assembly of the wheelbarrow to define a forward end position of the container on the frame, and the rear crossbar co-operating with the container for clamping the container in place on the frame.

According to yet another aspect of this invention there is provided a heavy duty collapsible wheelbarrow having a frame and a container, the container being securable to the frame in a "ready for use" position, and being releasable from this "ready for use" position to enable the wheelbarrow to be collapsed, the mounting of the container on the frame being achieved in two stages, the first stage involving engaging the container with the frame in such as way that the container cannot be lifted from the frame in the region of engagement, although it can still be slid out of said engagement, and the second stage involving clamping the frame and the container together in such a way as to prevent the container being slid out of said engagement with the frame.

In order that the present invention may be more readily understood, one design of a collapsible wheelbarrow according to the invention will now be described by way of example and with reference to the accompanying drawings in which:

FIG. 1 is a perspective view of a frame for a wheelbarrow, the frame being shown in an unfolded position;

FIG. 2 is a perspective view of a container adapted to be connected to the frame;

Figure 3:
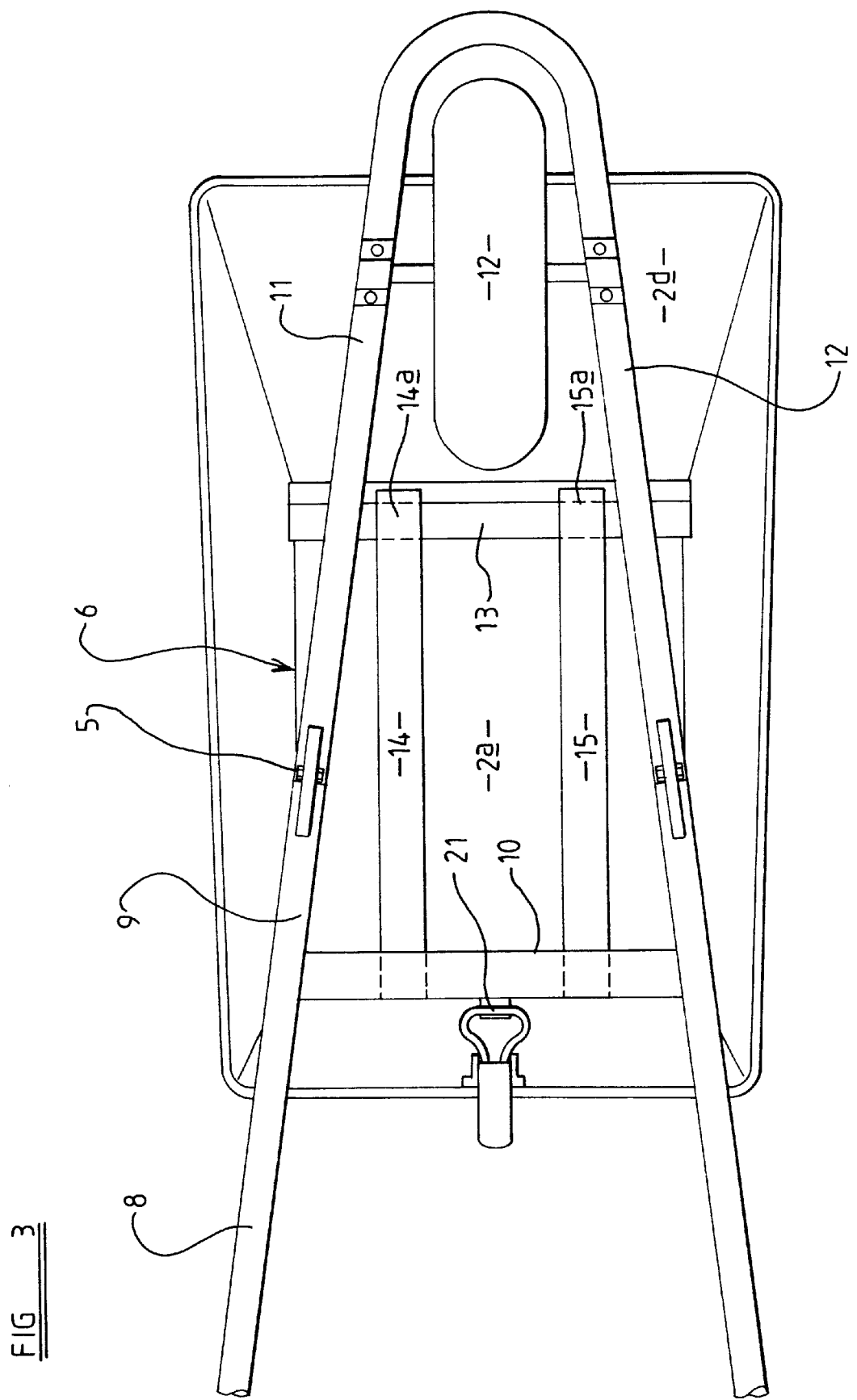
FIG. 3 is a plan view from below showing the frame of FIG. 1 and the container of FIG. 2 assembled together to form a ready-for-use wheelbarrow.

Referring to the above drawings there is shown a collapsible wheelbarrow comprising a frame 1 and a container 2 (sometimes called a tray or bucket) adapted to be attached to and detached from the frame 1. The frame itself comprises two parts 3 and 4 connected together at a pair of hinges 5, best shown in FIG. 4. Frame part 3 comprises the rear or "handle end", and has a pair of symmetrical sides 6 and 7, each side being made from suitably bent pieces of steel tubing. Each piece of side tubing 6 and 7 comprises a handle 8 and a conventional generally U-shaped leg 9 which merges with the handle 8. The handles 8 serve for the lifting the assembled wheelbarrow so that the legs 9 are clear of the ground and wheelbarrow can be wheeled. The legs 9 serve to support the wheelbarrow when it is not being wheeled.

A cross bar 10 connects the two sides 6 and 7 together and is welded to both sides in the regions where the handles 8 merge with the legs 9, The frame part 4 is the "Wheel end" of the wheelbarrow, and has a pair of side members 11 formed from a single piece of steel tubing bent generally into the shape a letter "V", a wheel 12 being supported in the apex region of the "V" in conventional manner. A second cross-bar 13 connects the side members 11 together in the region generally close to the hinges 5 at the widest part of the "V". As best shown in FIG. 1, the cross bar 13 has a portion 13a which is generally horizontal, and a portion 13b which extends from the forward edge of the horizontal portion 13a upwardly and forwardly at an angle of about 40 to 45 degrees to the horizontal.

As shown in FIGS. 2. 3, and 4, the container 2 to be secured to the frame 1 is made of steel and it is generally conventional in shape and construction, comprising a base 2a, a pair of side walls 2b, a rear wall 2c, and a front wall 2d. However, in contrast to conventional wheelbarrows, the container is reinforced by a pair of spaced apart parallel bars 14 and 15 (best shown in FIG. 3) which are secured to the base 2a of the container in any suitable way, such as by welding or bolting. These bars 14 and 15 extend generally longitudinally of the wheelbarrow, and as well as providing reinforcement, they also assist in securing the frame and the container together as will be explained below.

Figure 4:
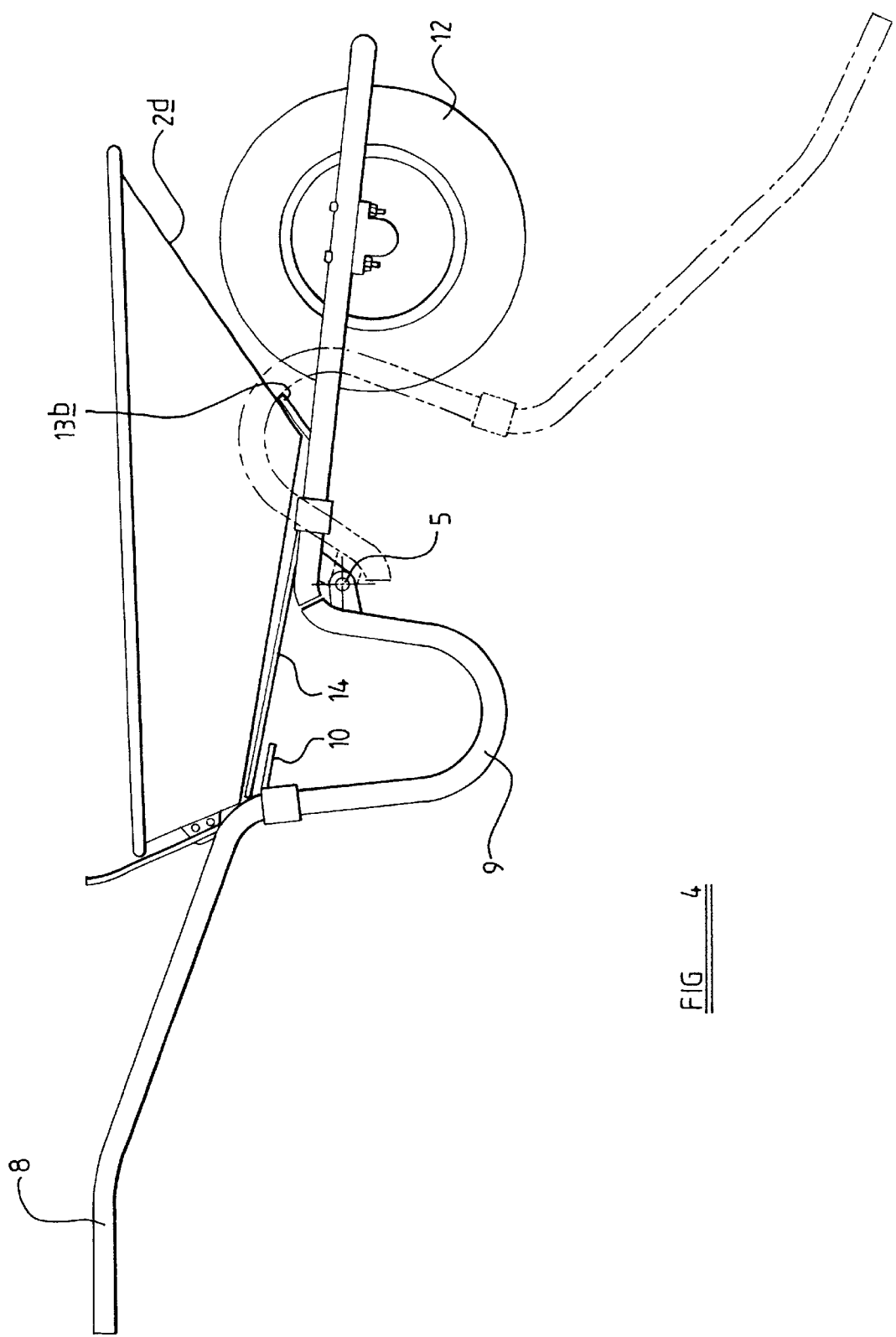
FIG. 4 is a side view of the assembled wheelbarrow of FIG. 3, the frame of the wheelbarrow also being shown in its collapsed configuration by the dashed outline.

As shown in FIG. 4, there is a space between the underside of the base 2a of the container and the two bars 14 and 15, this space being at its greatest size in the region of the forward ends 14a and 15a (FIG. 3) of the longitudinal bars. The length of the longitudinal bars 14 and 15 on the container is sufficient to span the distance between the two cross bars 10 and 13.

Figure 5:
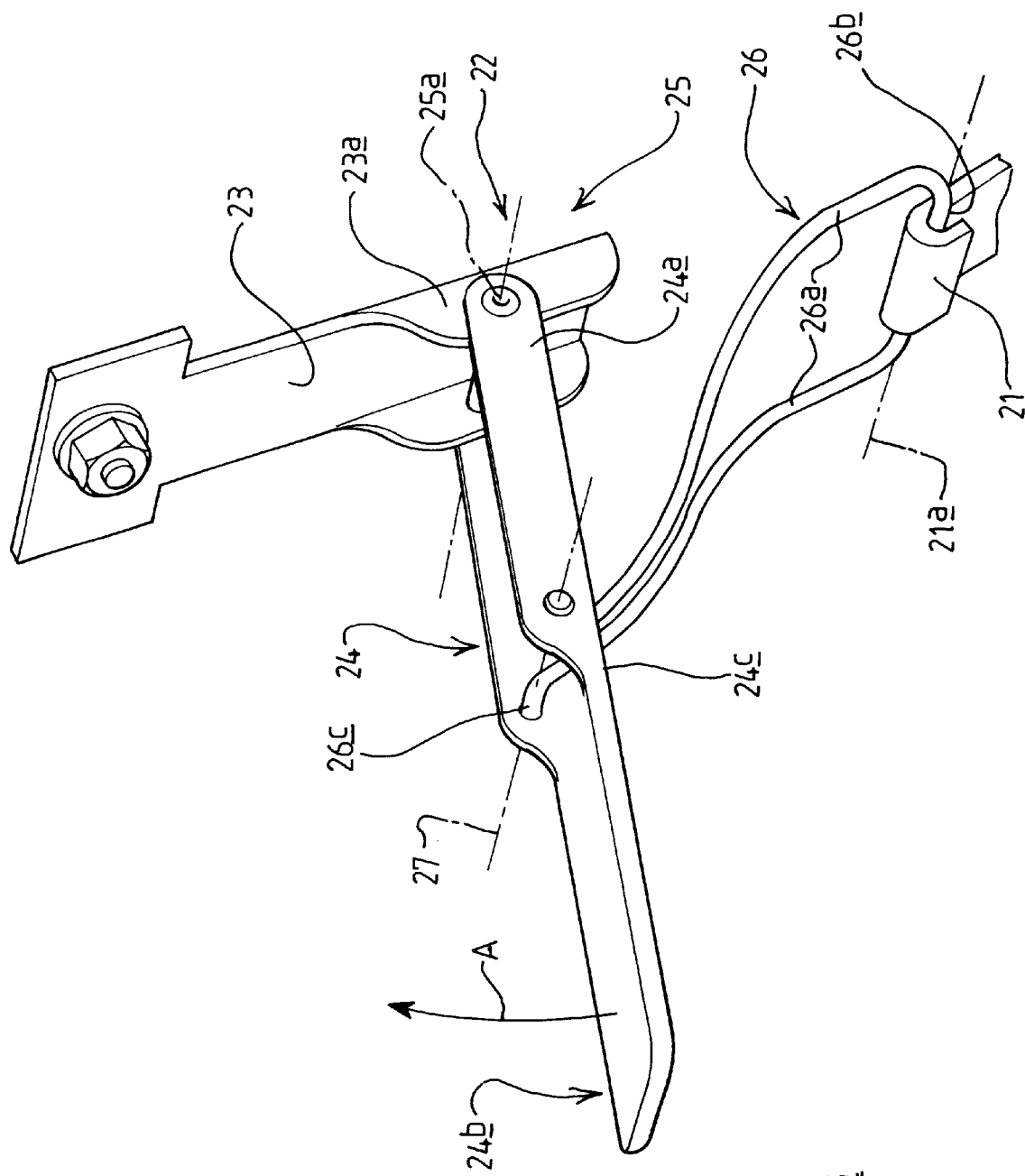
FIG. 5 is a perspective view showing an "over-center" locking mechanism used in securing the container in place on the frame.

An "over center" mechanism for securing to frame and the container together is shown in FIGS. 3 and 5, The mechanism comprises a hook 21 mounted on the crossbar 10 of the frame, and a mechanism 22 mounted on the container 2 to co-operate with the hook 21. The mechanism 22 comprises a plate 23 bolted or welded to the rear wall 2c of the container; an operating lever arm 24 pivoted to the plate 23 at a pivot axis 25; and a tensioning arm 26.

The plate 23 lies generally parallel with the rear wall 2c, but has a pair of lugs 23a which are bent at right angles to the wall 2c, the lugs having holes for the passage of a pivot pin 25a. The operating lever arm 24 is pivoted to an end region 24a to the plate 23, and is arranged to be gripped at an opposite end region 24b for manual operation of the lever arm. Arm 24 also has an intermediate region 24c to which the tensioning arm 26 is pivoted at a pivot axis 26a. The tensioning arm 26 is formed from a steel loop which can be said to be very approximately U-shaped, comprising a pair of side arms 26a which are connected together by a base 26b. The free ends 26c of the arms 26a of the "U" are bent away from each other to engage holes in the intermediate region of the lever arm 24 to define the pivot axis 26a mentioned above. As shown in FIG. 5, the end 26b of the tension arm engages the hook 21 at an axis 21a.

The way in which the container (FIG. 2) can be securely mounted on the frame (FIG. 1) will now be described. In a first stage the container 2 is lifted from its FIG. 2 position and reversed front to rear to place it the correct way round relative to the position of the frame 1 in FIG. 1. The container 2 is then placed onto the top of the rearmost crossbar 10 so that the longitudinal bars 14, 15 rest on top of the crossbar 10.

Next, the container 2 is slid forwardly so that the forward ends 14a and 15a of the bars 14 and 15 slide underneath the generally horizontal part 13a of the forward crossbar 13. The forward sliding movement of the container 2 ceases when the sloping front wall 2d of the container 2 abuts the correspondingly upwardly sloping part 13b of the crossbar 13. This completes the first step in securing the container 2 to the frame 1, the container 2 becoming engaged with the frame 1 in such as way that the front end of container cannot be lifted from the frame in the region where bars 14 and 15 fit under the front crossbar 13, although it could still be slid out of said engagement.

In this position, the rearward ends of the longitudinal bars 14 and 15 rest on the rearward crossbar 10, and base 2a just clears (lies forwardly of) the hook 21. At this time, the lever arm 24 will be in a downwards pivoted position due to the action of gravity, and it will occupy a position in which the tension arm 26 has its base 26b lying below the hook 21. In the second stage of securing the container to the frame, the end 24b of the operating lever 24 is gripped and the lever is pivoted in the direction of arrow A towards the rear wall 2c, it being understood that the base 26b of the tension arm will naturally engage the hook 21, or will be manually guided into engagement with the hook 21 (FIG. 5) during initial movement of the lever arm 24. The lever 24 is progressively pivoted manually as far as it will go (generally parallel with the rear wall 2c of the container 2) in order to lock the container in place. This clamps the frame and the container together in such a way as to prevent the container being slid out of engagement with the frame at the front end of the wheelbarrow.

During the pivoting of the lever just described, the axis 26a progressively moves towards a line passing through the pivot axes 21a and 25, the tension gradually increasing in the tension arm 26. Then, the lever arm 24 reaches a position in which the axes 26a, 25, and 21a are in line with each other, and the tension in the tension arm 26 reaches a maximum. After this, the lever 24 snaps to a stable end position under the force in the tension arm 26. Of course, as the tension in the tension arm increases, the compressive force acting on the part of the lever arm between the pivot axes 26a and 25 also progressively increases.

The clamping mechanism 21, 22 just described belongs to a class of mechanical devices which are sometimes referred to as "over center" mechanisms. Probably the best known use of an "over center" mechanism is in gripping devices known in the United Kingdom as "Mole Grips", the term "Mole" being a Trade Mark or Trade name. However, "over center" mechanisms are also commonly used for holding lids closed, for example on tool boxes. Similarly, "over center" mechanisms were also used to hold stoppers closed on bottles of carbonated drinks, as were sold under the trade name Corona.

"Over center" mechanisms can take many forms, but a common feature of them is that in their operation, a tensile or compressive force acting on a member progressively increases to a maximum, after which the mechanism snaps to a stable position.

When the wheelbarrow is to be collapsed, the assembly process just described is reversed to separate the wheelbarrow into two parts, i.e. the frame and the container. The frame is then folded about hinges 5 from its position illustrated in full lines in FIG. 4 to its position illustrated in dotted line in FIG. 4. This enables the folded frame to be placed inside the container 2 for stowage and/or transport. The wheelbarrow when assembled is the same size as conventional available wheelbarrows, but when collapsed as described above, it can be transported in the boot or other luggage space provided in most private cars. This enables a worker who is using his own vehicle to travel to and from work to carry a wheelbarrow to and/or from a building site It will be appreciated that with the wheelbarrow just described, fastening of the container to the frame can be achieved very quickly indeed, for example, after some experience, in ten seconds. There are no nuts, bolts, or pins which could become lost, damaged, and no tool of any kind is required. None of the operative parts of the fastening mechanism lie inside the container 2 to be covered in material such as concrete carried inside the wheelbarrow.

Many obvious modifications could be made to the wheelbarrow shown in the drawings. Some examples are given below. Any suitable "over center" locking mechanism could be used in place of the one illustrated. The positions of the hook 21 and of the mechanism 22 could be reversed. The hinges 5 could be replaced by nuts and bolts to enable the two parts of the frame to be separated. The wheel 12 could also be readily removable. The two spaced apart longitudinal bars 14 and 15 could be replaced by a single centrally positioned bar. The container 2 need not become completely detached from the frame in the collapsed condition of the wheelbarrow, since it would be possible for them to remain attached by some kind of linkage. One could also arrange the lever arm 24 so that it works similarly to the way described above, but it never actually snaps to an end position. In this case, the locking mechanism would still be an over center type mechanism, but the lever 24 would never reach a stable position. In this case, some additional catch would be needed to hold the lever 24 in place against the tension acting to release it.

What is claimed is:

1. A heavy duty collapsible wheelbarrow comprising:
    a frame;
    a container; and
    a mechanism for securing the container to the frame in an assembled condition of the wheelbarrow, the container being releasable from the assembled condition of the wheelbarrow to enable the wheelbarrow to be collapsed, the mechanism for securing the container to the frame including two connecting members and a locking member, one connecting member being secured to a rear wall of the container, the other connecting member being secured to the frame and the locking member being movable between a released position and a locking position, the connecting members being engageable with one another to connect the container and the frame together when the locking member is in its released position; and the locking member is movable from its released position towards its locking position with the connecting members engaged with one another to apply a progressively increasing tensile or compressive force to the connecting members and prevent the connecting members from disengaging in the assembled condition of the wheelbarrow.

2. A wheelbarrow according to claim 1, in which the mechanism for securing the container to the frame is an over-center mechanism and the tensile or compressive force applied to the connecting members progressively increases to a maximum as the locking member is moved from its released position, after which the locking member snaps to a stable locking position.

3. A wheelbarrow according to claim 1, in which the frame has front and rear crossbars which extend transversely of the frame from one side of the frame to the opposite side.

4. A wheelbarrow according to claim 2, in which the frame has front and rear crossbars which extend transversely of the frame from one side of the frame to the opposite side.

5. A wheelbarrow according to claim 4, in which an underside of the base of the container has means thereon to cooperate with the front crossbar to prevent the front end of the container from being lifted away from the front end of the frame in the assembled condition of the wheelbarrow.

6. A wheelbarrow according to claim 5, in which the said means on the underside of the container comprise at least one longitudinal bar.

7. A wheelbarrow according to claim 6 in which, in the assembled condition of the wheelbarrow, the forward end of the longitudinal bar fits beneath the front crossbar to prevent the front end of the container from being lifted away from the front end of the frame.

8. A wheelbarrow according to claim 7 in which, in the assembled condition of the wheelbarrow, the rear end of the longitudinal bar rests on top of the rear crossbar.

* * * * *